US005291982A

United States Patent [19]

Saito et al.

[11] Patent Number: 5,291,982

[45] Date of Patent: Mar. 8, 1994

[54] PASSENGER CONVEYOR, PLATFORM FLOOR FOR PASSENGER CONVEYOR, AND COMB FOR PLATFORM FLOOR

[75] Inventors: Chuichi Saito, Katsuta; Masao Takizawa, Mito; Kazutoshi Takeda, Katsuta; Kazuhira Ojima, Kasama; Mitsuo Saito, Katsuta, all of Japan

[73] Assignee: Hitachi, Ltd., Tokyo, Japan

[21] Appl. No.: 3,672

[22] Filed: Jan. 12, 1993

Related U.S. Application Data

[63] Continuation of Ser. No. 762,334, Sep. 19, 1991, abandoned.

[30] Foreign Application Priority Data

Sep. 19, 1990 [JP] Japan ................................. 2-247549

[51] Int. Cl.5 .............................................. B65G 47/66

[52] U.S. Cl. ..................................... 198/325; 198/324

[58] Field of Search ................ 198/321, 324, 325, 326

[56] References Cited

U.S. PATENT DOCUMENTS

| | | | |
|---|---|---|---|
| 1,956,154 | 4/1934 | Lindquist et al. | 198/325 |
| 2,016,104 | 10/1935 | Looper et al. | 198/325 |
| 3,144,117 | 8/1964 | Fabula et al. | 198/325 |
| 3,458,025 | 7/1969 | Earle | 198/325 |
| 4,126,218 | 11/1978 | El Taher et al. | 198/325 |

FOREIGN PATENT DOCUMENTS

| | | | |
|---|---|---|---|
| 2816396 | 10/1979 | Fed. Rep. of Germany | 198/325 |
| 7332049 | 3/1975 | France . | |
| 5718565 | 7/1980 | Japan . | |
| 0321292 | 12/1989 | Japan | 198/325 |
| 0321293 | 12/1989 | Japan | 198/325 |
| 2-23195 | 1/1990 | Japan | 198/325 |
| 0132093 | 5/1990 | Japan | 198/325 |
| 2-209385 | 8/1990 | Japan | 198/325 |
| 0893790 | 1/1982 | U.S.S.R. | 198/324 |
| 482508 | 3/1938 | United Kingdom . | |
| 505409 | 5/1939 | United Kingdom . | |
| 516537 | 1/1940 | United Kingdom . | |
| 918176 | 2/1963 | United Kingdom . | |
| 1020737 | 2/1966 | United Kingdom . | |

*Primary Examiner*—James R. Bidwell
*Attorney, Agent, or Firm*—Antonelli, Terry, Stout & Kraus

[57] ABSTRACT

A passenger conveyor includes a platform floor having a slanting portion. A length of the slanting portion is not less than a length of each of treadboards of the passenger conveyor, and at least one of the treadboards of an advance side, when passing under the platform floor, is disposed horizontally beneath the slanting portion. With this arrangement, a push cart or the like can be smoothly moved from the treadboard to the platform floor.

14 Claims, 6 Drawing Sheets

PASSENGER CONVEYOR, PLATFORM FLOOR FOR PASSENGER CONVEYOR, AND COMB FOR PLATFORM FLOOR

This application is a continuation of application Ser. No. 07/762,334, filed Sep. 19, 1991, now abandoned.

BACKGROUND OF THE INVENTION

This invention relates to a passenger conveyor such as an escalator and an electrically-operated sidewalk (people-mover).

Generally, with respect to a platform portion of a passenger conveyor, a distal end portion of a platform floor is slants downwardly toward treadboards, and a comb for meshing engagement with cleats of the treadboard is mounted on a distal end of the slanting portion (Japanese Patent Unexamined Publication No. 57-18565).

In the above prior art, no consideration is given to the case where the passenger conveyor carries a push cart, and also to the case where elderly or physically-handicapped people use the passenger conveyor. Particularly when the passenger gets off the passenger conveyor, the passenger may hit his toe against the comb to fall, or when the push cart is moved onto the platform floor, the wheels of the push cart may strike against the comb.

SUMMARY OF THE INVENTION

It is an object of this invention to provide a passenger conveyor which enables a push cart to be smoothly moved from a treadboard to a platform floor.

Another object of the invention is to provide a passenger conveyor in which the toe of a passenger is less liable to hit on a comb.

A further object of the invention is to provide a passenger conveyor in which even if a foreign matter is trapped between the treadboard and the comb, damage is kept to minimum.

A still further object of the invention is to provide a passenger conveyor in which even when the tooth of the comb is broken, the operation of the passenger conveyor can be continued safely.

A further object of the invention is to provide a comb for a platform floor which can be easily manufactured.

According to one aspect of the present invention, a length of a slanting portion of a platform floor is not less than a length of each treadboard, and at least one of the treadboards of an advance side, when passing under the platform floor, is disposed horizontally beneath the slanting portion.

With this arrangement, the length of the slanting portion can be increased, and therefore the angle of inclination of the slanting portion relative to the treadboard can be reduced. Because of this decreased inclination angle, the angle of the teeth (for meshing with cleats of the treadboard) of a comb relative to the treadboard is also reduced; and therefore, wheels of a push cart can be smoothly moved onto the comb, and the toe of a passenger is less liable to strike against the comb. Further, since the inclination of the slanting portion is made gentler as described above, the slanting portion is disposed closer to the treadboard disposed beneath it. Therefore, when the treadboard is to be turned to change the direction of travel thereof, the trailing end of this treadboard is raised and would be brought into engagement with the inner or lower surface of the slanting portion, so that the turning of the treadboard would be prevented. However, since one treadboard is always disposed horizontally beneath the slanting portion, the turning treadboard is disposed at an upstream side of the slanting portion; therefore, the turning treadboard will not interfere with the platform floor.

According to another aspect of the invention, a projection length of teeth from a comb body is greater than a length of overlapping of the teeth on the comb body, and each of the teeth is thinned at its inner portion over a region extending from a proximal end of the tooth toward the distal end of the tooth.

With this arrangement, even when foreign matter is caught between the tooth of the comb and the cleat of the treadboard, damage to the cleat is minimal, and even if the thinned portion of the tooth is broken off, the thickened portion of the tooth remains; therefore, a large space or gap will not be present between the comb and the cleats at a position where the thinned portion of the tooth has been broken off. Therefore, the operation of the passenger conveyor can be continued safely.

DESCRIPTION OF THE PREFERRED EMBODIMENTS

Figure 1:
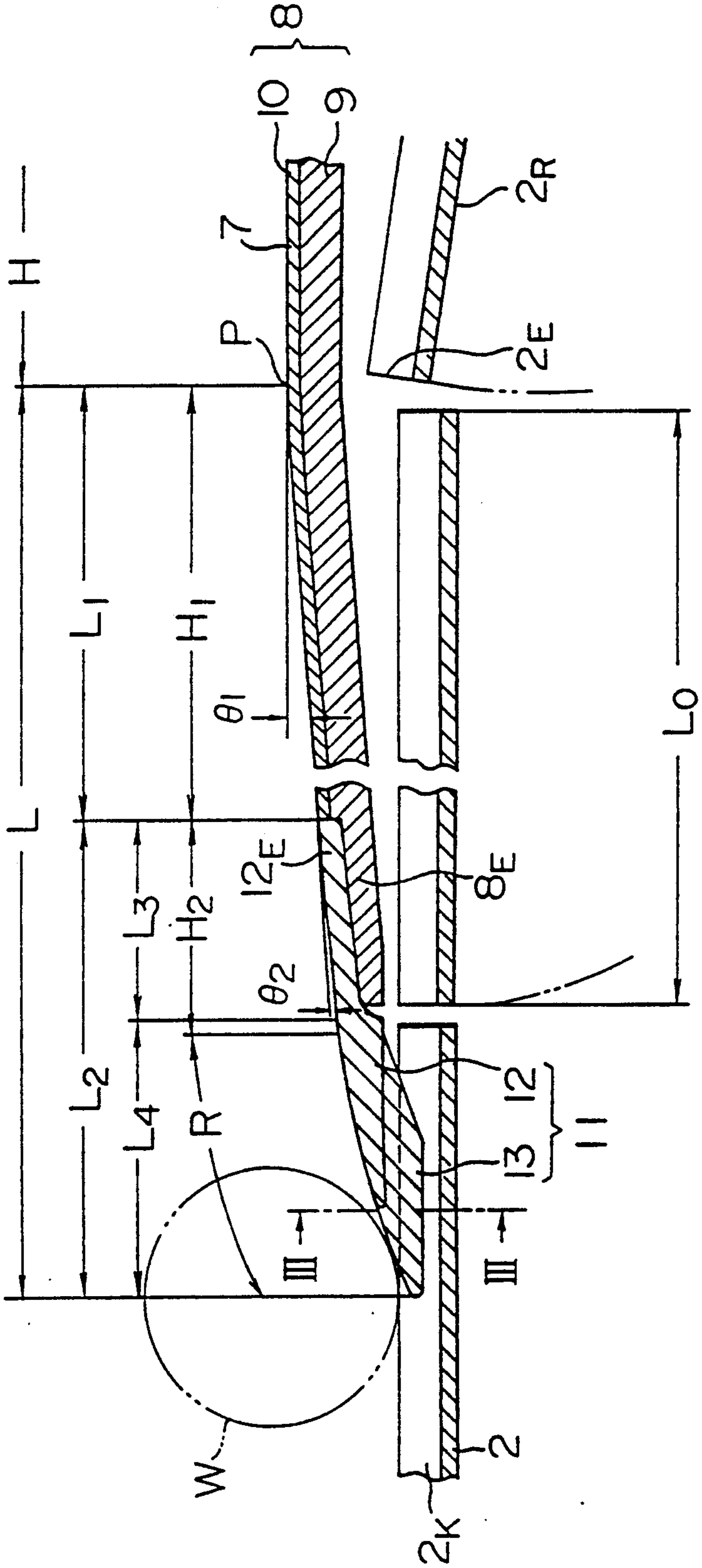
FIG. 1 is a vertical cross-sectional view of a portion of a platform floor of a passenger conveyor according to the present invention.
Figure 2:
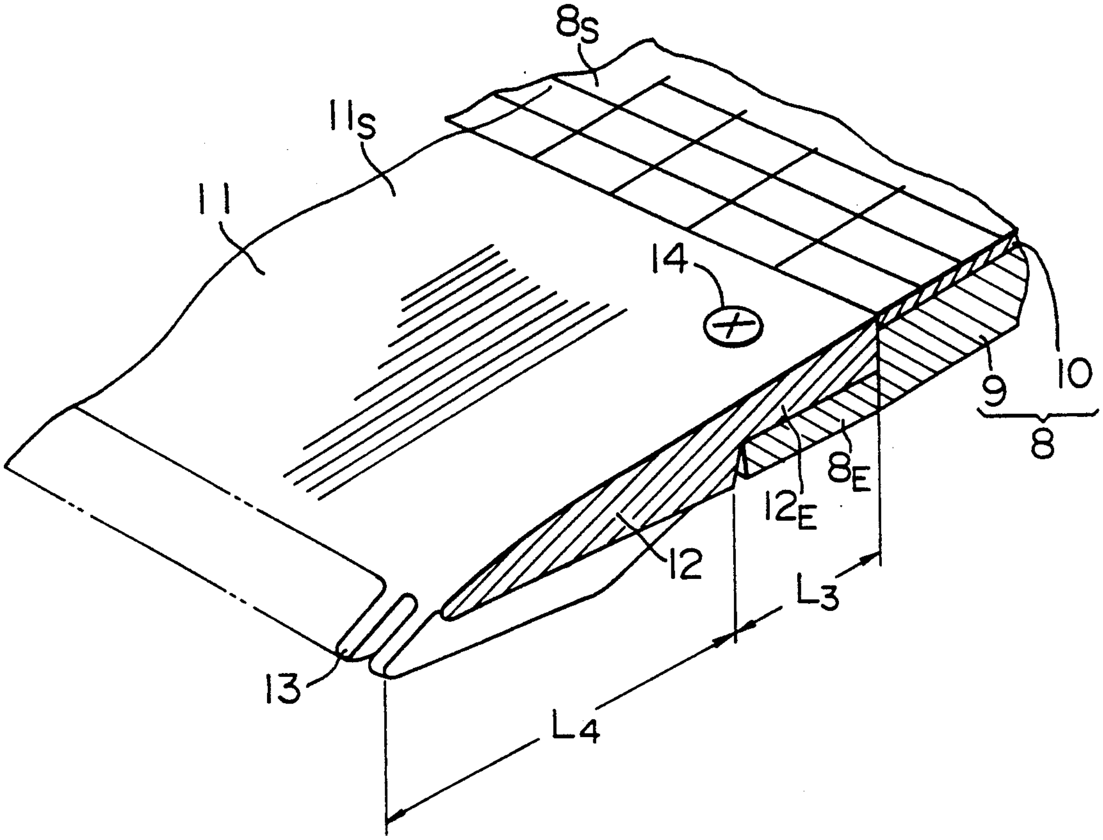
FIG. 2 is a perspective view of a portion of the platform floor.
Figure 3:
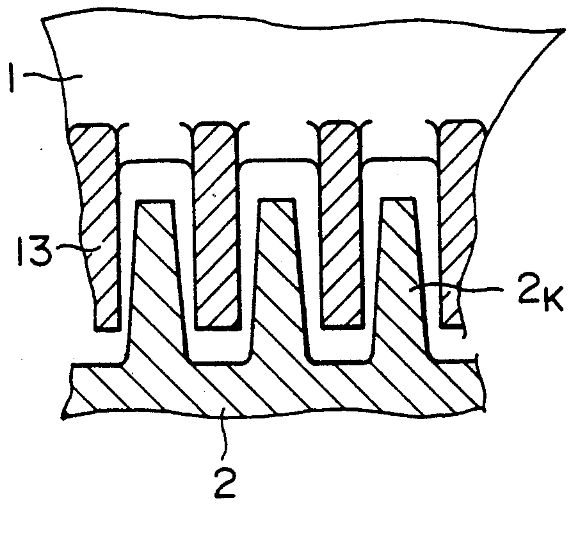
FIG. 3 is a fragmentary cross-sectional view taken along the line III—III of FIG. 1.
Figure 4:
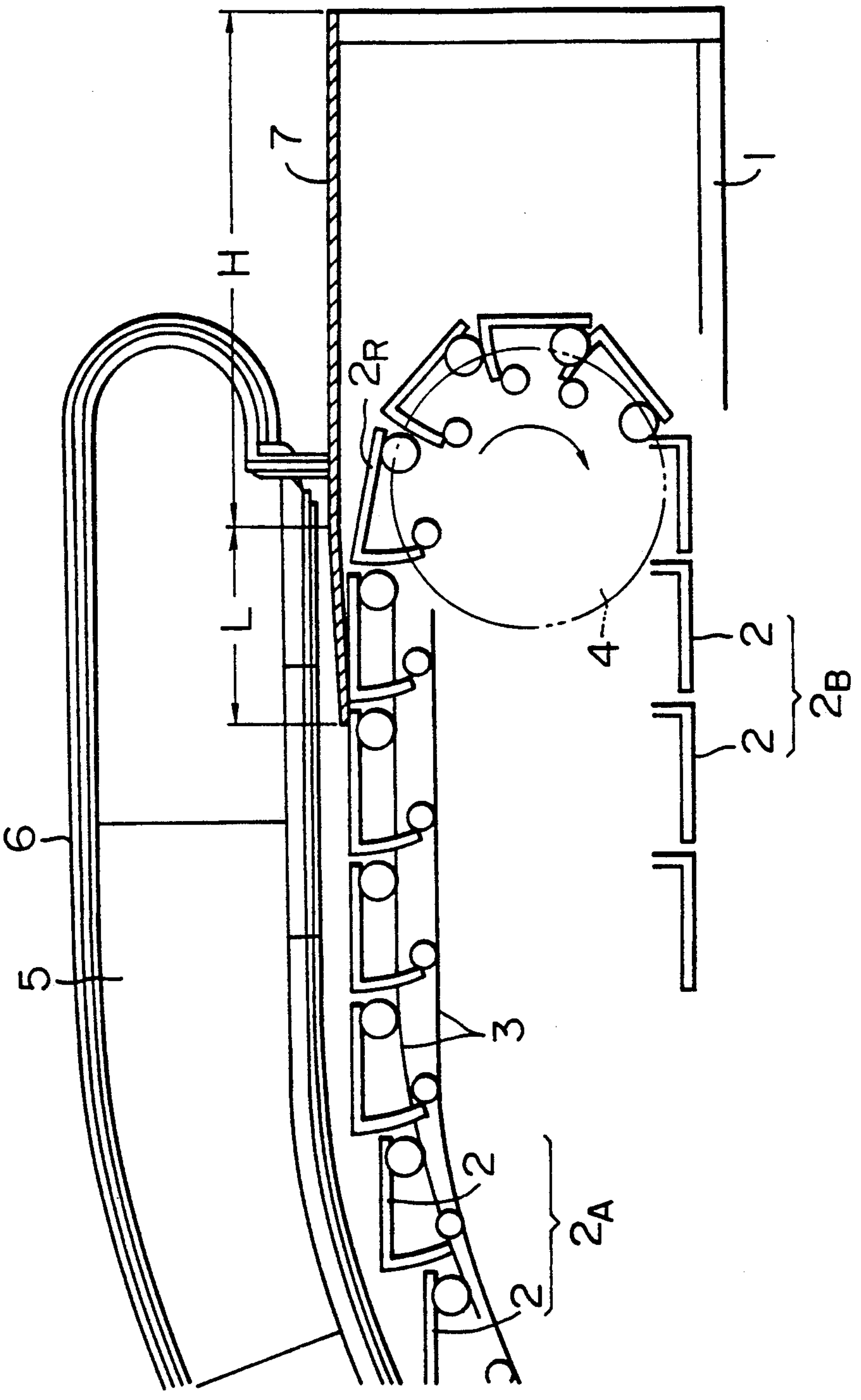
FIG. 4 is a vertical cross-sectional view, showing a platform portion of the passenger conveyor of the invention.

An ascending escalator embodying the invention will now be described with reference to FIGS. 1 to 4. FIG. 4 shows an upper platform portion of the escalator where passengers get off the escalator. A frame 1 is extended between floors (not shown) of adjacent upper and lower stairs of a building, and treadboards 2, balustrades 5, moving handrails 6 and a platform floor 7 are supported on the frame 1. A plurality of treadboards 2 are interconnected in an endless manner, for example, by chains (not shown). An advance side 2A of the treadboards 2 interconnected in an endless manner carries passengers, a push cart and so on, and moves toward the upper stair, and a return side 2B of the interconnected treadboards 2 moves beneath the advance side 2A in a reverse direction. The treadboards 2 of the advance side 2A are guided by guide rails 3 fixedly mounted on the frame 1. Sprockets 4 are provided at upper and lower turning portions where the direction of movement of the treadboards 2 is changed from the advance side 2A to the return side 2B, and vice versa. The above-mentioned chains interconnecting the treadboards 2 are extended around the sprockets 4. Therefore, the treadboards (designated by 2R) reaching the upper sprockets 4 are turned or inverted one after another. A pair of balustrades 5 are upstanding, and are respectively provided on the opposite sides of the interconnected treadboards 2 of the advance side 2A. A pair of handrails 6 are respectively supported on the peripheral edges of the balustrades 5 so as to move in synchronism with the movement of the treadboards 2. The platform floor 7 is provided at the end of the advance side 2A of the treadboards 2, and is fixedly mounted on the frame 1 in overlying relation to the turning treadboard 2R to cover the same.

The platform floor 7 comprises a floor plate 8 composed of a base plate 9 of a high strength and a decorative plate 10 mounted on an upper surface of the base plate 9, and a comb 11 mounted on a distal end of the floor plate 8. The comb 11 comprises a body 12 and teeth 13. The teeth 13 project forwardly from the distal end of the body 12 and also project downwardly from the body 12. The teeth 13 are meshed with a plurality of cleats 2K in a non-contact manner which cleats are formed on the treadboard 2. An upwardly-directed stepped portion is formed on the distal end portion of the base plate 9, and this stepped portion provides a support portion 8E supporting the comb 11. A downwardly-directed stepped portion is formed on the rear end portion of the body 12 of the comb 11 remote from the teeth 13, and this stepped portion provides a mounting portion 12E through which the comb 11 is supported on the base plate 9. The mounting portion 12E is superposed on the support portion 8E, and then they are fixedly connected together by flush-head screws 14. The thicknesses of the support portion 8E and the mounting portion 12E are determined in such a manner that when the comb 11 is fixedly secured to the floor plate 8, an upper surface 11S of the comb 11 is not stepped with respect to an upper surface 8S of the floor plate 8, but is smoothly continuous with the upper surface 8S.

The platform floor 7 having the comb 11 mounted on its distal end is formed in the abovementioned manner. In order to reduce a step between the platform floor 7 and the moving treadboard 2 the platform floor 7 has a slanting portion L extending continuously from a horizontal portion H thereof. The length of the slanting portion L is not less than a length Lo of the treadboard 2 in the direction of travel thereof. By thus increasing the length of the slanting portion L while keeping the height of the horizontal portion H of the platform floor 7 relative to the treadboard 2 equal to the conventional height, the angle of inclination (slanting) of the slanting portion L is gentler. Therefore, when the passenger or a push cart is moved from the treadboard 2 to the platform floor 7, the impact of striking of the passenger's toe against the comb 11, as well as the impact of movement of the push cart onto the platform floor 7, is reduced, so that the safety, when getting off the escalator, can be enhanced. As a result of the gentle inclination of the slanting portion L, the slanting portion L is closer to the treadboard 2 moving below the platform floor 7, as compared with the conventional construction. The treadboard 2 (2R) moving below the platform floor 7 is turned, and a trailing end 2E of this turning treadboard 2R is once raised during the turning movement thereof. As a result, the raised trailing end 2E of the treadboard 2R would impinge on the gently-slanting portion L disposed closer to the treadboard than before, so that the platform floor 7 or the treadboard 2R would be damaged or broken. To avoid this difficulty, in the present invention, the platform floor 7 is so arranged that at least one treadboard 2 of the advance side 2A can be disposed horizontally beneath the slanting portion L of the platform floor 7. That at least one treadboard 2 is present in a horizontal condition beneath the slanting portion L means that any treadboard 2 will not be turned at this region; therefore, the turning treadboard 2R will not impinge on the slanting portion L.

For the reasons mentioned above, in the present invention, it is necessary to increase the length of the slanting portion L to make its inclination gentler, and it is also necessary that at least one treadboard 2 should be disposed horizontally beneath the slanting portion L. In other words, the point P of start of the slanting portion L is disposed near the position where the trailing end 2E of the turning treadboard 2R is most raised.

The slanting portion L is includes a slanting portion L1 of the floor plate 8 and a slanting portion L2 of the comb 11. The slanting portion L1 is formed by a flat surface H1, and the slanting portion L2 is formed by a flat surface H2 and a curved surface R. The flat surface H1 is inclined at a angle $\theta 1$ of not more than 5° with respect to the horizontal portion H (and hence the horizontally-disposed treadboard 2), and the length of the slanting portion L is not less than 300 mm, in which case the invention can be practiced without substantially changing the conventional construction. Particularly, the inclination angle $\theta 1$ was 3°, and the flat surface H2 was inclined with respect to the flat surface H1 at an angle $\theta 2$ less than the inclination angle $\theta 1$, and the length of the slanting portion L was 530 mm, in which case the getting-on and -off were easy and safe. The radius of curvature of the curved surface R is about 300 mm.

The length L4 of that portion of the comb 11 between its distal end and the mounting portion 12E is at least 1.5 times larger than the length L3 of the mounting portion 12E to increase the radius of curvature of the curved surface R. Incidentally, with respect to a model used for an experiment, the length of the slanting portion L2 of the comb 11 was about 115 mm, and the length L3 of the mounting portion 12E was about 40 mm, and the length L4 was about 75 mm. In this case, a push cart could be smoothly moved onto the platform floor 7. Thus, by increasing the distal end portion of the comb 11 and also by increasing the radius of curvature thereof, the inclination of the comb 11 relative to the treadboard 2 can be made gentle, and therefore the toe of the passenger as well as wheels W of a push cart can easily move onto the comb 11. As described above, the overall length of the comb 11 is long, and the length L4 of the comb 11 projecting from the base plate 9 is long, and therefore preferably the comb 11 should not be made of a synthetic resin, but should be made of metal, such as an aluminum alloy, so as to withstand a large load of a push cart and so on.

In the above embodiment, each of the teeth 13, which projects from the distal end of the body 12 of the comb 11 and also projects into the gap between the cleats 2K of the treadboard 2, has a uniform thickness over the entire area thereof so that the gap between the tooth 13 and the cleat 2K can be as small as possible. Where the comb 11 is made of an aluminum alloy so as to withstand a large load, the mechanical strength of the teeth 13 are much superior to that achieved by a synthetic resin. If foreign matter, such as a small stone and a coin, intrudes in the gap between the tooth 13 of the comb 11 and the cleat 2K of the treadboard 2, one or both of the tooth 13 and the cleat 2K would be broken. As a result, a large gap is provided between the stationary comb 11 and the moving treadboard 2, and there is a risk that the toe of the passenger may be caught in this large gap.

Figure 5:
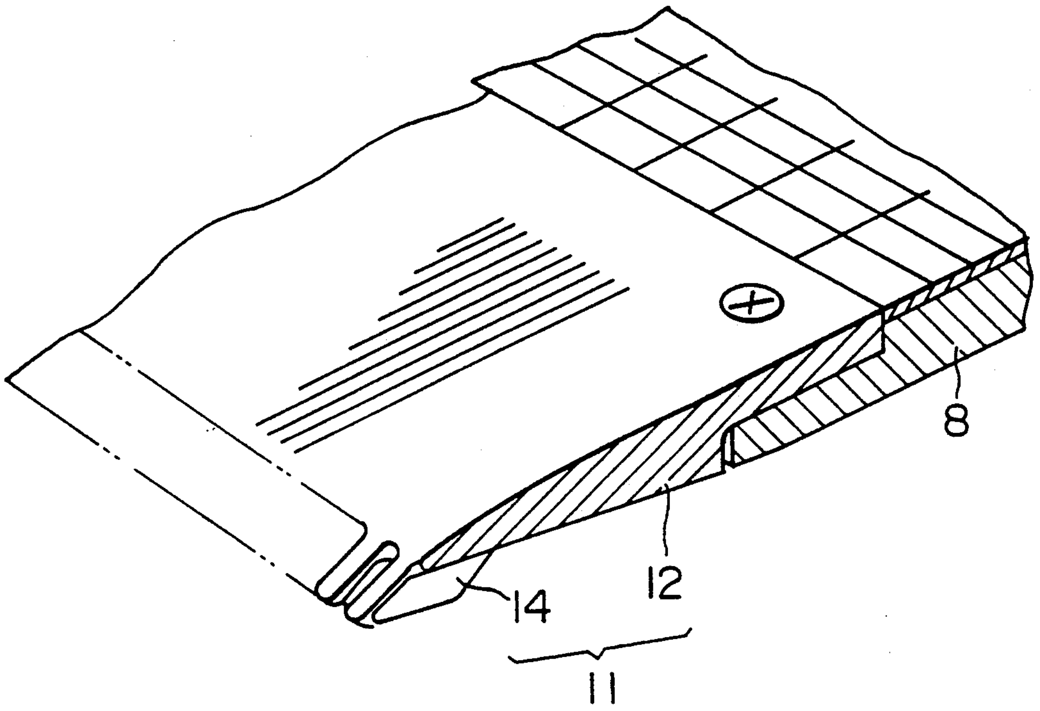
FIG. 5 is a perspective view of a portion of a modified platform floor.
Figure 6:
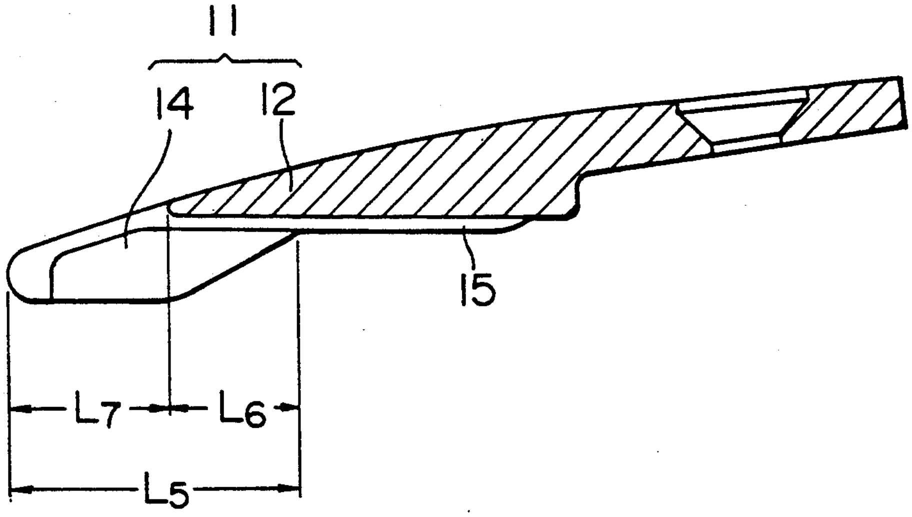
FIG. 6 is a vertical cross-sectional view of a comb for the platform floor of FIG. 5.
Figure 7:
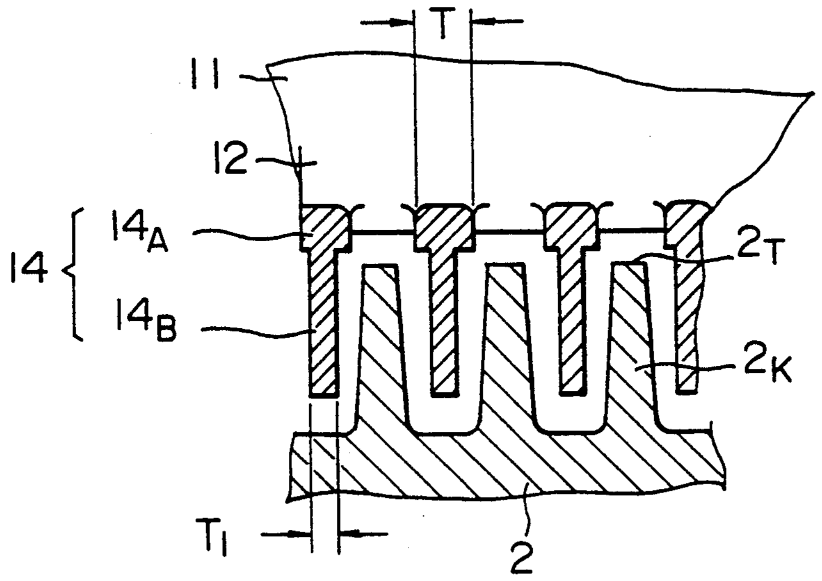
FIG. 7 is a view similar to FIG. 3, but showing the comb of FIG. 6.

To avoid this difficulty, according to a modified form of the present invention, an improved configuration of teeth 14 of a comb 11 is provided as shown in FIGS. 5 to 7. Although this modified comb 11 is similar in basic construction to the comb 11 of the preceding embodiment in that the teeth 14 project from a distal end of a body 12 away from its rear end and also project into the gaps between the cleats 2K of the treadboard 2, the thickness and length of the teeth 14 are improved. More specifically, the length L5 of the tooth 14 in the direction of travel of the treadboard 2 is shorter than that of the tooth 13 of the preceding embodiment. The length L6 that portion of the tooth 14 overlapping the body 12 is shorter than the length L7 of that portion of the tooth 14 projecting from the distal end of the body 12 along the direction of travel of the treadboard 2. The tooth 14 is thickened at its distal end and its upper portion over a region extending from this distal end to its rear end to provide a thickened portion 14A, and the remainder (that is, the inner portion of the tooth 14) is thinned as at 14B. That section of the thickened portion 14A overlapping the body 12 is extended toward the rear or proximal end of the body 12 to form a reinforcement rib 15 on the lower or inner surface of the body 12. The thickened portion 14A is formed mainly on the upper surface portion of the tooth 14, and an abrupt step is formed at the boundary between the thickened portion 14A and the thinned portion 14B. The reinforcement rib 15 and the thickened portion 14A linearly continuous therewith are disposed above an upper surface 2T of the cleat 2K of the treadboard 2.

Figure 8:
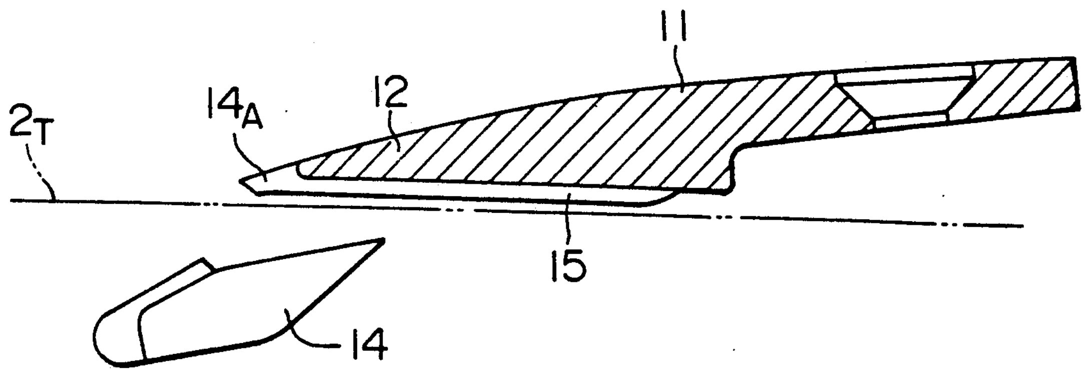
FIG. 8 is a vertical cross-sectional view showing the condition of breakage of a tooth of the comb of FIG. 6.

With the above configuration (i.e., the length and thickness) of the teeth 14, even if foreign matter intrudes into the gap between the tooth 14 and the cleat 2K, a force tending to deform the tooth 14 or the cleat 2K concentrates on the stepped portion between the thickened portion 14A and the thinned portion 14B of the tooth 14, so that generally the entire tooth 14 is broken off the body 12 at this stepped portion, as shown in FIG. 8. Thus, the damage by the intruding foreign matter is undertaken by the comb 11 which can be easily attached to and detached from the floor plate 8; and therefore, such damage can be kept to minimum, and the damaged comb 11 can be replaced by a new comb in a short time.

Figure 9:
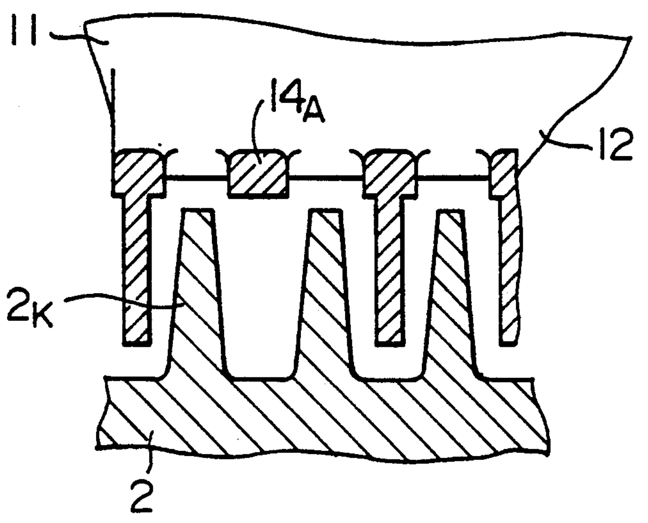
FIG. 9 is a view similar to FIG. 3, but showing a relationship between the broken comb and a treadboard.

FIG. 9 shows the relationship between the treadboard 2 and the comb 14 one tooth 14 of which has been broken. As can be seen from the cross-sectional view of FIG. 9, a considerable space or gap is provided between the broken tooth 14 and the two adjacent cleats 2K generally opposed thereto. However, the thickened portion 14A of the broken tooth 14, which is continuous with the reinforcement rib 15, is projected from the lower surface of the comb body 12 opposed to the upper surfaces 2T of the cleats 2K, and is disposed immediately above the above-mentioned space. Thus, the upper portion of this space is not open, and the toe of the passenger will not be caught by that portion where the tooth 14 has been broken. Therefore, even if the tooth 14 is broken, the escalator need not be immediately stopped, and the comb 11 is exchanged with a new one when the escalator is not crowded, or after a daily operation of the escalator.

Figure 10:
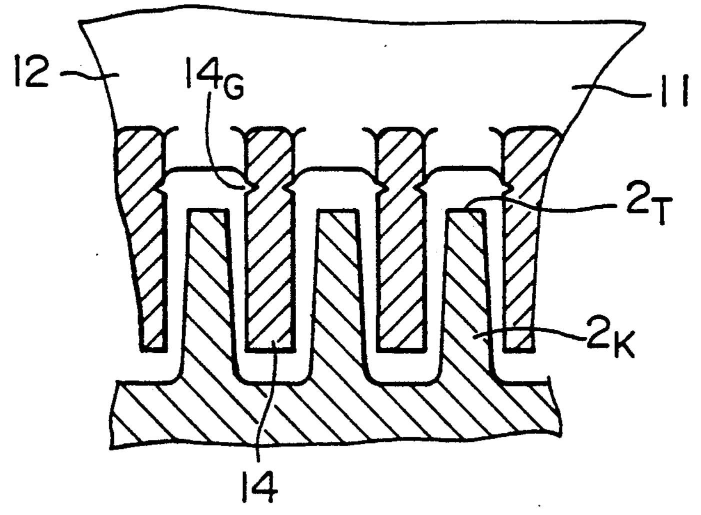
FIG. 10 is a view similar to FIG. 3, but showing a relationship between a treadboard and a comb having teeth of a modified cross-section.

In the above embodiment, in order to facilitate the breakage of the tooth 14, the thickened portion 14A and the thinned portion 14B are provided to form the stepped portion on the tooth 14. However, as shown in FIG. 10, instead of changing the thickness of the tooth 14, a groove 14G may be formed in each side surface of the tooth 14. Each groove 14 is disposed between the lower surface of the comb body 12 and the upper surface 2T of the cleat 2K. Also, instead of the grooves 14G, a number of through holes may be formed through the tooth 14 along a line corresponding to a line along which the groove 14 extends.

The comb 11 is integrally molded by pouring a synthetic resin material or an aluminum alloy material in a mold. In view of the direction of release of the molded comb from the mold, the grooves 14G or the through holes can not be formed by this molding operation, and they must be formed after the molding is finished. However, to form the grooves or the through holes in the teeth 14 spaced closely from one another is a very cumbersome operation. Therefore, in view of the moldability of the comb 11, it is most preferred that the thickness of the tooth 14 be changed to provide the stepped portion.

Although the above description has been directed to the escalator, the present invention can be applied to an electrically-operated sidewalk in which each treadboard is not stepped with respect to its adjoining treadboard. Further, although the above description is directed to the upper platform portion (i.e., the exit portion) of the upwardly-moving escalator, the present invention may be applied also to a lower platform portion if the escalator is designed to be operated in a reversible manner (that is, in both upward and downward directions). Further, with respect to the escalator or the electrically-operated sidewalk moving in one direction, the present invention only need to be applied to the exit portion; however, for the purpose of standardizing the platform parts, the present invention may be applied also to an entrance platform.

As described above, according to the present invention, there is provided the passenger conveyor in which the passenger and a push cart can get off the conveyor smoothly and safely, and even if foreign matter is trapped between the treadboard and the comb, damage resulting from the foreign matter can be kept to minimum, so that safe operation of the passenger conveyor can be continued.

What is claimed is:

1. A passenger conveyor comprising:

a plurality of treadboards interconnected in an endless manner so as to move along a predetermined path of travel having an advance side and a return side;

a platform floor provided at a platform of said advance side, said platform floor having upper and lower surfaces and having a slanting portion slanting downwardly in such a manner that the upper and lower surfaces of said slanting portion of the platform floor become closer to said treadboard of said advance side progressively toward a distal end of said slanting portion, and each of said treadboards is turned below said platform floor to be shifted from said advance side to said return side, wherein a length of said slanting portion in the direction of travel of said treadboards is not less than a length of said treadboard in said direction of travel; and wherein a starting point of said slanting portion remote from said distal end thereof is disposed in a vicinity of a highest position of a track of said treadboard during a turning of said treadboard below said platform floor.

2. A passenger conveyor comprising:

a plurality of treadboards interconnected in an endless manner so as to move along a predetermined path of travel having an advance side and a return side;

a platform provided at a platform of said advance side, said platform floor having upper and lower surfaces, and having a slanting portion slanting downwardly in such a manner that the upper and lower surfaces of said slanting portion of said platform floor become closer to said treadboard of said advance side progressively toward a distal end of said slanting portion, and each of said treadboards is turned below said platform floor to be shifted from said advance side to said return side, wherein said slanting portion has a length such that part of said treadboard beginning to be turned and the whole of said treadboard connected to a trailing end of said treadboard which is beginning to be turned and is disposed horizontally, are disposed beneath said slanting portion.

3. A passenger conveyor comprising:

a plurality of treadboards interconnected in an endless manner so as to move along a predetermined path of travel having an advance side and a return side;

a platform floor provided at a platform of said advance side, said platform floor having upper and lower surfaces and having a slanting portion slanting downwardly in such a manner that the upper and lower surfaces of said slanting portion come closer to said treadboard progressively toward a distal end of said slanting portion, and each of said treadboards is turned below said platform floor to be shifted from said advance side to said return side, wherein the angle of inclination of said slanting portion is not more than 5°, a length of said slanting portion is not lesser than 300 mm, and wherein said slanting portion has a length such that part of said treadboard beginning to be turned and the whole of said treadboard connected to a trailing end of said treadboard which is beginning to be turned and is disposed horizontally, are disposed beneath said slanting portion.

4. A passenger conveyor according to one of claims 1, 2 or 3, wherein said slanting portion extends in a direction of the slanting toward its distal end to increase its length.

5. A passenger conveyor according to one of claims 1, 2 or 3, wherein said slanting portion has a plurality of flat surfaces of different inclination angles relative to said treadboard disposed horizontally.

6. A passenger conveyor according to one of claims 1, 2 or 3, wherein said slanting portion has two flat surfaces and a curved surface continuous with one of said flat surfaces in the direction of travel of said treadboards.

7. A passenger conveyor comprising:

a plurality of treadboards interconnected in an endless manner so as to move along a predetermined path of travel having an advance side and a return side;

a platform floor provided at a platform of said advance side, said platform floor having upper and lower surfaces and having a said slanting portion slanting downwardly in such a manner that the upper and lower surfaces of said slanting portion of the platform floor become closer to said treadboard of said advance side progressively toward a distal end of said slanting portion, and each of said treadboards is turned below said platform floor to be shifted from said advance side to said return side, wherein a part of said treadboard beginning to be turned and the whole of said treadboard which is connected to a trailing end of said treadboard which is beginning to be turned and is disposed horizontally, are disposed beneath said slanting portion, said slanting portion includes a floor member and a comb fixedly mounted on a distal end portion of said floor member, said comb having a fixing portion fixedly mounted on said floor member, and wherein a projection portion projects from said floor member, and a length of said projection portion is at least 1.5 times greater than a length of said fixing portion.

8. A passenger conveyor comprising:

a plurality of treadboards interconnected in an endless manner so as to move along a predetermined path of travel having an advance side and a return side;

a platform floor provided at a platform of said advance side, said platform floor having upper and lower surfaces and having a slanting portion slanting downwardly in such a manner that said upper and lower surfaces of the slanting portion of the platform floor become closer to said treadboard of said advance side progressively toward a distal end of said slanting portion, and each of said treadboards is turned below said platform floor to be shifted from said advance side to said return side, wherein said slanting portion has a length such that part of said treadboard beginning to be turned and the whole of said treadboard which is connected to a trailing end of said treadboard which is beginning to be turned and is disposed horizontally, are disposed beneath said slanting portion, said slanting portion includes a comb provided at the distal end portion thereof, said comb having a body, and teeth formed on said body so as to be meshed with cleats formed on each of said treadboards, and wherein a projection length of said teeth from said comb body along the direction of travel of said treadboards is greater than a length of overlapping of said teeth on said comb body along said direction of travel.

9. A comb for a platform floor for a passenger conveyor, the comb comprising:

a body fixedly mounted at its proximal portion at a distal end of a floor member of said platform floor in overlapping relationship thereto, and teeth formed on a distal end portion of said body so as to be meshed with cleats formed on each of a plurality of treadboards of said passenger conveyor, wherein a projection length of said comb from the distal end of said floor member to distal ends of said teeth is at least 1.5 times greater than a length of overlapping of said proximal portion of said body of said comb on said floor member, wherein an upper surface of said body has a flat surface formed on said proximal portion and a curved surface continuous with said flat surface and extending substantially over said projection length, and wherein reinforcement ribs are formed on a lower surface of said body and extend along upper surfaces of said teeth to distal ends of said teeth.

10. A comb for a platform floor for a passenger conveyor the comb comprising:

a body fixedly mounted at its proximal portion on a distal end of a floor member of said platform floor in overlapping relation thereto, and teeth formed on a distal end portion of said body so as to be meshed with cleats formed on each of a plurality of treadboards of said passenger conveyor;

wherein a projection length of said comb from the distal end of said floor member to distal ends of said teeth is at least 1.5 times greater than a length of overlapping of said proximal portion of said comb body on said floor member; and wherein a projection length of said teeth from said comb body along a direction of travel of said treadboard is greater than a length of overlapping of said teeth on said body.

11. A comb according to claim 10, wherein an upper surface of said body has a flat surface formed on said proximal portion, and a curved surface continuous with said flat surface and extending substantially over said projection length.

12. A comb according to claim 10, wherein reinforcement ribs are formed on a lower surface of said body and extend along upper surfaces of said teeth to distal ends of said teeth.

13. A comb for a platform floor for a passenger conveyor the comb comprising:

a body fixedly mounted at its proximal portion on a distal end of a floor member of said platform floor in overlapping relation thereto, and teeth formed on a distal end portion of said body so as to be meshed with cleats formed on each of a plurality of treadboards of said passenger conveyor;

wherein a projection length of said comb from the distal end of said floor member to distal ends of said teeth is at least 1.5 times greater than a length of overlapping of said proximal portion of said comb body on said floor member;

a projection length of said teeth from said comb body along a direction of travel of said treadboards is greater than a length of overlapping of said teeth on said body, and wherein each of said teeth is thinned at its inner portion over a region extending from a proximal end of the respective teeth toward the distal end of the respective teeth.

14. A comb for a platform floor for a passenger conveyor, the comb comprising:

a body fixedly mounted at its proximal portion at a distal end of a floor member of said platform floor in an overlapping relationship thereto, and teeth formed on a distal end portion of said body so as to be meshed with cleats formed on each of a plurality of treadboards of said passenger conveyor, and wherein reinforcement ribs are formed on a lower surface of said body and extend along upper surfaces of said teeth to distal ends of said teeth.

* * * * *